(No Model.) 2 Sheets—Sheet 1.
C. BARUS.
MACHINE FOR MEASURING VARIABLE ANGLES BETWEEN ROTATING BODIES.
No. 599,522. Patented Feb. 22, 1898.
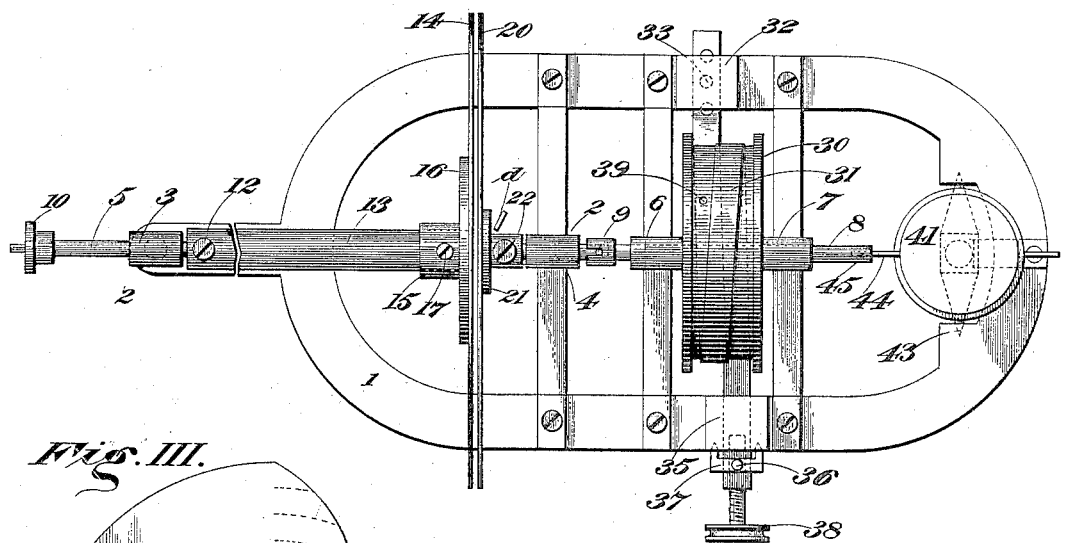
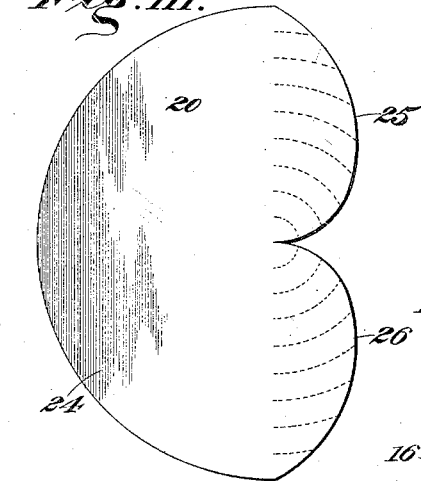
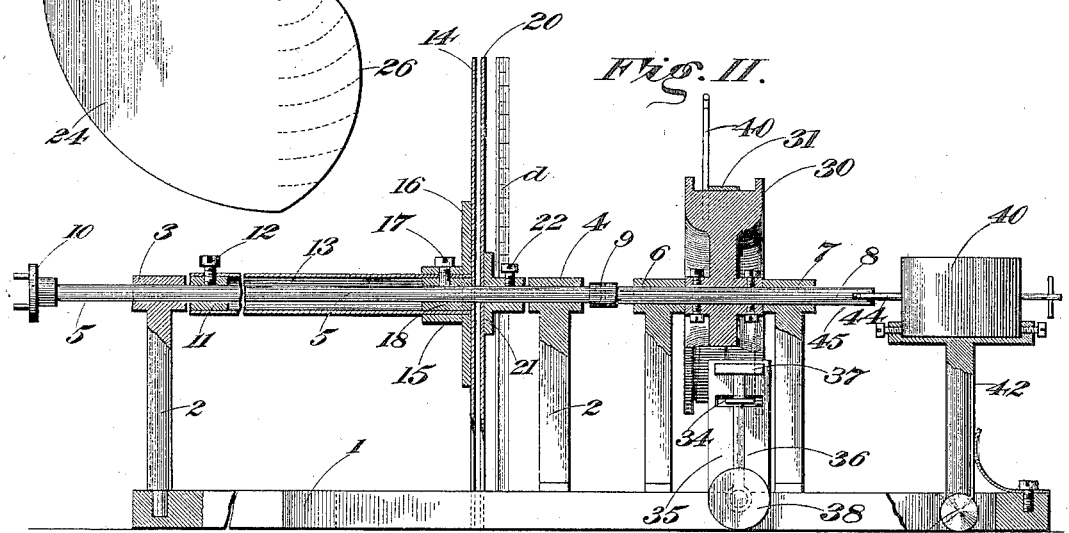
Witnesses
M. Fowler
S. N. Acker
Inventor
Carl Barus
By Joseph L. Atkins
Attorney (No Model.) 2 Sheets—Sheet 2.
C. BARUS.
MACHINE FOR MEASURING VARIABLE ANGLES BETWEEN ROTATING BODIES.
No. 599,522. Patented Feb. 22, 1898.
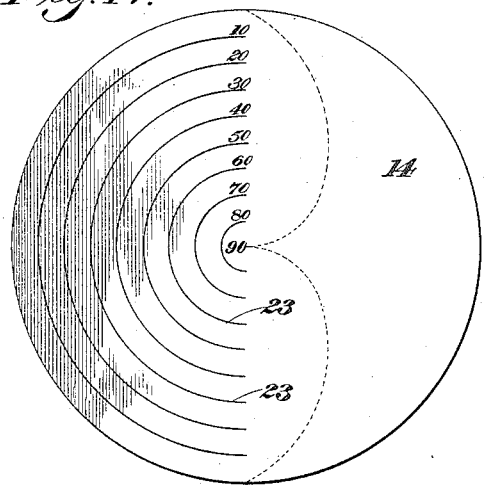
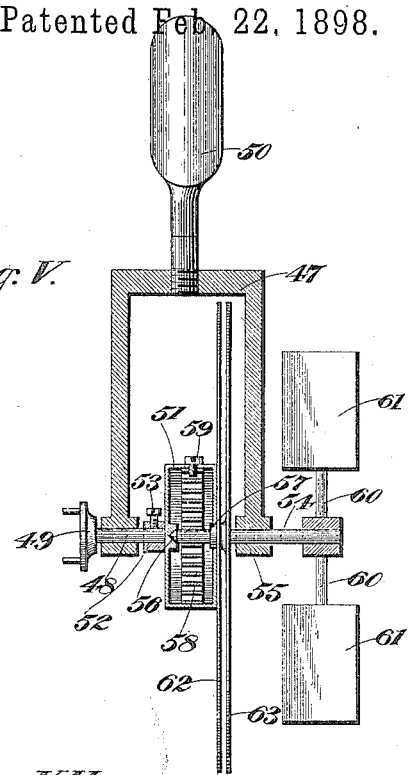
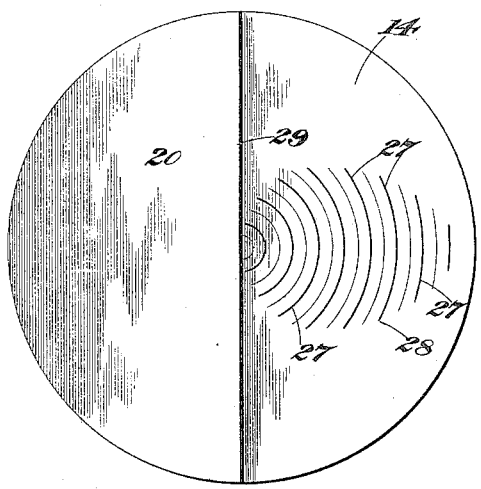
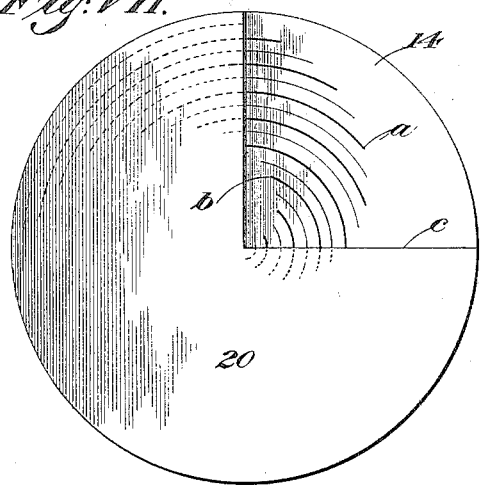
Witnesses
M. E. Fowler
S. W. Acker
Inventor
Carl Barus
By Joseph L. Atkins
Attorney
THE NORRIS PETERS CO., PHOTO-LITHO., WASHINGTON, D. C.

UNITED STATES PATENT OFFICE.

CARL BARUS, OF WASHINGTON, DISTRICT OF COLUMBIA, ASSIGNOR OF ONE-HALF TO JOSEPH L. ATKINS, OF SAME PLACE.

MACHINE FOR MEASURING VARIABLE ANGLES BETWEEN ROTATING BODIES.

SPECIFICATION forming part of Letters Patent No. 599,522, dated February 22, 1898.

Application filed December 20, 1894. Serial No. 532,492. (No model.)

*To all whom it may concern:*

Be it known that I, CARL BARUS, of Washington, District of Columbia, have invented a certain new and useful Machine for Measuring Variable Angles Between Rotating Bodies, of which the following is a specification, reference being had to the accompanying drawings.

The object of my invention is to produce a machine for measuring variable angles between coaxially-rotating bodies, whereby one factor necessary in determining certain mathematical problems may be with practical accuracy obtained.

My invention, although not confined to such a use, is designed to be employed in ascertaining in terms of horse-power the work put out by a shaft per unit of time. In the drawings accompanying the specification my machine is shown as specially equipped for this purpose.

Referring to the drawings, Figure I is a top plan view of my machine. Fig. II is a vertical section thereof, some of the parts being shown in elevation. Fig. III is a front view of the index-plate. Fig. IV is a similar view of the dial-plate, the relation of the index-plate to the dial-plate when at rest being shown in dotted lines. Fig. V is a side elevation, partially in section, of a modified form of my machine. Fig. VI is a front view of a modified form of dial-plate and index-plate. Fig. VII is a similar view of another modification.

Referring to the figures on the drawings, 1 indicates the bed-piece of my machine, which may be made of suitable material and dimensions, the main part thereof being of a general elliptical form, as shown clearly in Fig. I of the drawings.

2 indicates uprights which in journal-bearings 3 and 4 revolubly respectively carry a shaft 5 and in journal-bearings 6 and 7 in like manner carry an extension-shaft 8, that is separately united, as by a pin 9, to one end of the shaft 5. The shaft 5 is provided with any suitable coupling device—as, for example, 10—designed to couple the shaft 5 to any revolving shaft, so that the rotation of the latter may be correctly represented in the rotation of the shaft 5. The shaft 5 may be made of any suitable material—as, for example, steel or other elastic substance—and of any suitable form—as, for example, cylindrical, tubular, or ribbon shaped—depending upon the strength required in it. Indeed, a completely-equipped machine may be provided with shafts of graduated ranges of strength. If the cylindrical or tubular form of shaft 5 be departed from, special provision, as by bushing, must be provided for securing its rotation within its journals 3 and 4.

11 indicates a bushing firmly secured, as by an abutment-screw 12, to the shaft 5. Inasmuch as it is from the place of location of the bushing 11 that the torsion of the shaft 5 is to be measured, that portion between the bushing 11 and the coupling 10 (shown in the drawings as an extension of the shaft 5) may in fact be an extension of the bushing 11. The office, however, of the bushing is to firmly couple with the shaft 5, at the place where the bushing is located, a surrounding tube 13, that is preferably made of steel and extends coaxially with the shaft 5 in the direction of the extension-shaft 8. Near the journal-bearing 4 the tube 13 terminates and is provided with a rigidly-fixed dial, preferably a dial-plate 14, preferably consisting of a circular plane disk of suitable material. Inasmuch as it is designed that the shaft 5 beyond the bushing 11 shall be susceptible of torsion independent of the tube 13, a preferable form of mechanism for uniting the plate 14 to the tube 13 consists of an exterior collar 15, provided with a flange 16, the collar being secured, as by set-screws 17, to the tube 13, the set-screws passing through the walls of the tube and screwing into those of an interior bushing 18. By this means a rigid support for the dial-plate 14 is obtained, while at the same time within the bushing 18 a smooth bearing for the torsional movement of the shaft 5 independent of the tube 13 is provided.

In close proximity to the plate 14, but separated from it, an index, preferably an index-plate 20, securely fixed to the shaft 5, is arranged. The plate 20 may, for example, be fastened to a flange-collar 21, that is fixed to the shaft 5, as by an abutment-screw 22. The dial-plate 14 is provided with a series of concentric equidistant semicircular lines 23, traced upon it and should be numbered consecutively "0°" to "90°." The lines may be traced in black upon a white surface; but for the sake of legibility I shall prefer in practice to employ white lines upon a black surface. The index-plate 20 is in practice preferably uniformly black in color and consists of a semicircular part 24, coextensive with that part of the plate 14 upon which are inscribed the semicircular lines. The part 24 is so located upon the shaft 5 that when the parts are at rest it completely covers and obscures the inscribed portion of the plate 14, the relative positions of the two plates 20 and 14 being clearly shown by dotted lines in Fig. IV of the drawings. The edges 25 and 26 of the plate 20 are defined by two symmetrical confluent spirals. Other mathematical curves constructed to fill the requirements of the machine might be devised, but these are suggested as suitable examples. They are employed in duplicate in order to act as indicators irrespective of the direction in which the shaft 5 may be revolved.

The above-described mechanism constitutes one form of the material embodiment of my invention. To comprehend, therefore, its significance, suppose the shaft 5 to be in continuous rotation. The plates 14 and 20 are rotated equally and the faces of both will appear in rotation to be perfectly blank. If now the shaft 5 is loaded, so as to impart to it a twist, the relations of the index-plates will be disturbed and the ends of a number of the semicircles proportionate to the amount of the load will emerge from behind the plate 20, the number of the appearing semicircles being proportional to the angle of rotation of the index-plate 20 to the tube 13. Assuming, therefore, that there is a semicircle for each degree of arc, it is merely necessary to count the number of visible circles on the rotating system of the dial and index and at once read off the twist of the shaft 5 relative to the tube. A fixed scale $d$ may be used for facilitating the reading. During the rotation of the dial and index the visible ends of the semicircles appear to be completed circles, so that there will be no difficulty in readily reading the record. Similarly any curve or straight or broken line bounding the partial circles may be employed with a bounding edge in the index-plate, provided the relations between the two bounding edges be such that in the rotational displacement of the two plates the observed radial increments or decrements are proportional to the angular increment or decrement of rotation, or, in other words, that the two bounding edges are equivalent to a spiral and a straight edge. For example, the dial-plate and index-plate illustrated in Fig. VI may be employed, in which the partial circles 27 are bounded by a somewhat circular or elliptical line 28 and the bounding edge 29 of the index-plate is straight. In this example the necessary relations of the bounding edges are preserved, so that the indexing operation of the dial and index plates when in rotation is preserved; but in this particular example the visible ends of the partial circles first appear in proximity to the center of the plates, and in the other form of dial and index plates illustrated the visible ends of the partial circles first appear near the periphery of the plates.

The maximum angle that can be read is indefinitely great, no matter whether rotations are to take place in one direction only or in both; but the system of spirals used must be placed with reference to the maximum angle to be measured. In Fig. VII, illustrative of this proposition, the spirals grow in the same direction on the dial-plate. The index in this case is a circle with a sector or sectors cut out of it. If rotation takes place in one direction, one of the bounding radii of the sector is the fiducial edge and the circles which appear are counted from without inward. This device may be made to read by repetition—that is to say, upon the dial-plate is inscribed two spirals $a\ b$, respectively, and the index-plate is shown as having a sector $c$. The spirals $a\ b$ may be read independently and thereby indefinitly increase the capacity of the machine.

In addition to the above-described mechanism suitable mechanism for applying a load for twisting the shaft 5 is also illustrated, consisting of the extension-shaft 8, already described, and a peripherally-grooved pulley 30, secured thereto between the journal-bearings 6 and 7.

31 indicates a flexible band or belt firmly secured at one end to an upright 32 upon the bed-plate 1, as by a pin 33, and which is passed around the pulley 30. The other end of the band 31 is passed through a slot 34 in a rigid upright 35, springing from the base 1 and is secured to a pin-shaped lever 36. The lever is provided at one end with a fulcrum 37, that bears against the upright 35, and at the other end with a thumb-screw 38, that screws into the lever and bears against the bed-plate and is adapted to move the lever upon its fulcrum, and thereby to control the tension of the band 31. Any degree of tension may be by this means imparted to the band, which, binding upon the pulley 30, imparts a proportionate load to the shaft 5.

Any suitable means for preventing undue heating of the parts by friction may be provided—as, for example, a spray (not illustrated) adapted to discharge upon the pulley. The pulley and spray may be covered with a hood (not illustrated) to prevent objectionable accumulation and discharge of water. These parts are only such as are ordinarily employed for similar purposes and are not illustrated because they would merely unnecessarily multiply or obscure the drawings.

It is desirable also to produce in the pulley radial apertures 39, within which may be set movable hook-shaped pins 40 for the purpose of twisting the shaft 5 with a known weight that may be suspended from the end of the hook. In this way the tension-rod is standardized.

In addition to the mechanism above described any suitable and well-known revolution counter or tachometer 41, carried upon a swinging standard 42, pivoted, for example, as indicated at 43, may be provided. The shaft 44 of the tachometer may be coupled to the extension-shaft 8, as indicated at 45.

The application of the tachometer is merely incidental to a complete machine for some of the uses to which my invention is applicable, but does not form a part of my invention.

To more fully illustrate the operation of my machine, I subjoin a description of one of the applications to which it may be put—namely, in measuring horse-power. To measure the work put out by a shaft per unit of time, it is sufficient to multiply the moment of the torsion of the shaft by its angular speed, and then reduce the result to practical units—horse-power, for instance. Angular speeds are measurable with nicety by the aid of the tachometer 41, for example. A single preliminary determination of the torsional coefficient of the shaft 5—i. e., a preliminary measurement of the static moment of twist—is necessary, and that may be easily accomplished by twisting the shaft 5 by a known weight on a known lever-arm 40, noting the corresponding twist of the shaft 5. Then to obtain the activity of any motor multiply the torsional coefficient of the shaft 5 by the observed twist and by the observed angular speed of the shaft and reduce the activity so obtained to horse-power in the well-known way.

It is expedient to make the shafts 5 of such diameters and lengths that when the number of revolutions per unit of time is multiplied by the angle of twist the products may be in decimals of a horse-power.

In the modification illustrated in Fig. V, I show a frame 47, provided with a revoluble shaft 48, having a coupling 49 corresponding to the coupling 10. (Shown elsewhere in the drawings.) The frame is designed to be supported in place, as by a handle 50. 51 indicates a cylindrical box that is firmly secured to a collar 52, which is fixed to the shaft 48, as by an abutment-screw 53. 54 indicates a shaft carried in a bearing 55 and which preferably sits into a conical bearing 56 in the end of the collar 52. A bushing 57 is provided in the end of the box 51 for the rotation of the shaft 54. A spring—as, for example, the coil-spring 58—secured at one end to the shaft 54 and adjustably secured at the other end, as indicated at 59, to the interior periphery of the box 51 is employed. If, therefore, the shaft 48 is rotated and there is no means of resistance provided against the rotation of the shaft 54, they will rotate together. In providing such resistance I employ in place of the brake mechanism heretofore illustrated and described radial arms 60, secured to the end of the shaft and provided with adjustable oblique vanes 61, which, revolving against the resistance of the atmosphere, retard the rotatory movement of the shaft 54. For measuring the angle torsion I employ the dial-plate 62, secured in the box 51, and the index-plate 63, secured to the shaft 54. As above suggested, the relative shapes of the dial and the index plates may be varied. They may be, for example, such as are shown in Figs. III and IV, respectively, or in Fig. VI of the drawings.

I do not confine myself to the details of construction herein shown and described, but reserve to myself the right to modify and vary them within the scope of my invention. In this connection it is perhaps worthy of note that the pulley and belt employed in loading the shaft 5 are merely illustrative and suggestive of various kinds of mechanism that may be employed for that purpose.

What I claim is—

1. An apparatus for measuring variable angles between bodies occupying coaxial relations, but movable independently, with relation to each other, about such axis, comprising an index and dial, arranged adjacent to each other, the index having a bounding edge, and the dial a series of lines, the ends of which are arranged so as to be covered by the index when the bodies are occupying the same angular position, and to be successively exposed by the movement of the said bounding edge as the angular positions of the bodies vary, substantially as set forth.

2. An apparatus for measuring variable angles between two coaxially-rotating bodies, comprising an index and a dial, one carried by each of the said bodies, and arranged adjacent to each other, there being upon the dial a series of partial circles, and the index having a bounding edge arranged to cover and uncover the ends of the said partial circles, according as its position is changed by the difference in the angular positions of the two bodies, the relations of the ends of the said partial circles and the said bounding edge to each other, being equivalent to a spiral and a straight line, substantially as and for the purposes set forth.

3. In a machine for measuring variable angles between rotating bodies, the combination with a rotatory shaft adapted to be coupled to a shaft whose moment is to be measured, of a dial-plate and index-plate, the former rotating coaxially with the shaft, but independent of its torsion, and the latter secured to the shaft in front of the dial-plate, substantially as set forth.

4. In a machine for measuring variable angles of rotating bodies, the combination with a shaft, and index-plate secured thereto, of a dial-plate synchronously and coaxially rotatory with the shaft, but independent of its torsion, concentric, semicircular lines upon the dial-plate, and a spiral edge upon the index-plate, substantially as and for the purpose specified.

5. In a machine for measuring variable angles between rotating bodies, the combination with a rotatory shaft and index-plate secured thereto, of a dial-plate synchronously and coaxially rotatory with the shaft, but independent of its torsion, semicircular, concentric lines upon the dial-plate, and edges upon the index-plate formed to correspond with two symmetrical confluent spirals, substantially as and for the purpose specified.

6. In a machine for measuring variable angles between rotating bodies, the combination with a rotatory shaft and index-plate secured thereto, of a dial-plate synchronously and coaxially rotatory with the shaft, but independent of its torsion, the relative movement of the index-plate with respect to the dial-plate being adapted to indicate the amount of twist in the shaft, and mechanism for loading the shaft and imparting to it a twist, substantially as set forth.

7. In a machine for measuring variable angles between rotating bodies, the combination with a rotatory shaft and index-plate secured thereto, of a dial-plate synchronously and coaxially rotatory with the shaft, but independent of its torsion, the relative movement of the index-plate with respect to the dial-plate being adapted to indicate the amount of twist in the shaft, and mechanism for loading the shaft, and imparting to it a twist, consisting of a pulley, a band secured at one end to the frame of the machine and passing around the pulley, and mechanism for imparting tension to it at the other end, substantially as and for the purpose specified.

8. In a machine for measuring variable angles between rotating bodies, the combination with a frame, uprights and journal-bearings, of a shaft carried in the bearings, a tube extending coaxially to the shaft and secured thereto at one end but free at the other, a dial-plate secured to the tube at its free end, and an index-plate secured in front of the dial-plate to the shaft, the index by its movement relative to the dial-plate being adapted to indicate the amount of twist in the shaft, substantially as set forth.

In testimony of all which I have hereunto subscribed my name.

CARL BARUS.

Witnesses:
   LOUIS G. JULIHN,
   HARRY Y. DAVIS.